No. 886,690. PATENTED MAY 5, 1908.
C. L. FOWLE.
REEL FOR DRYING FISHING LINES.
APPLICATION FILED MAY 23, 1904.
2 SHEETS—SHEET 1.
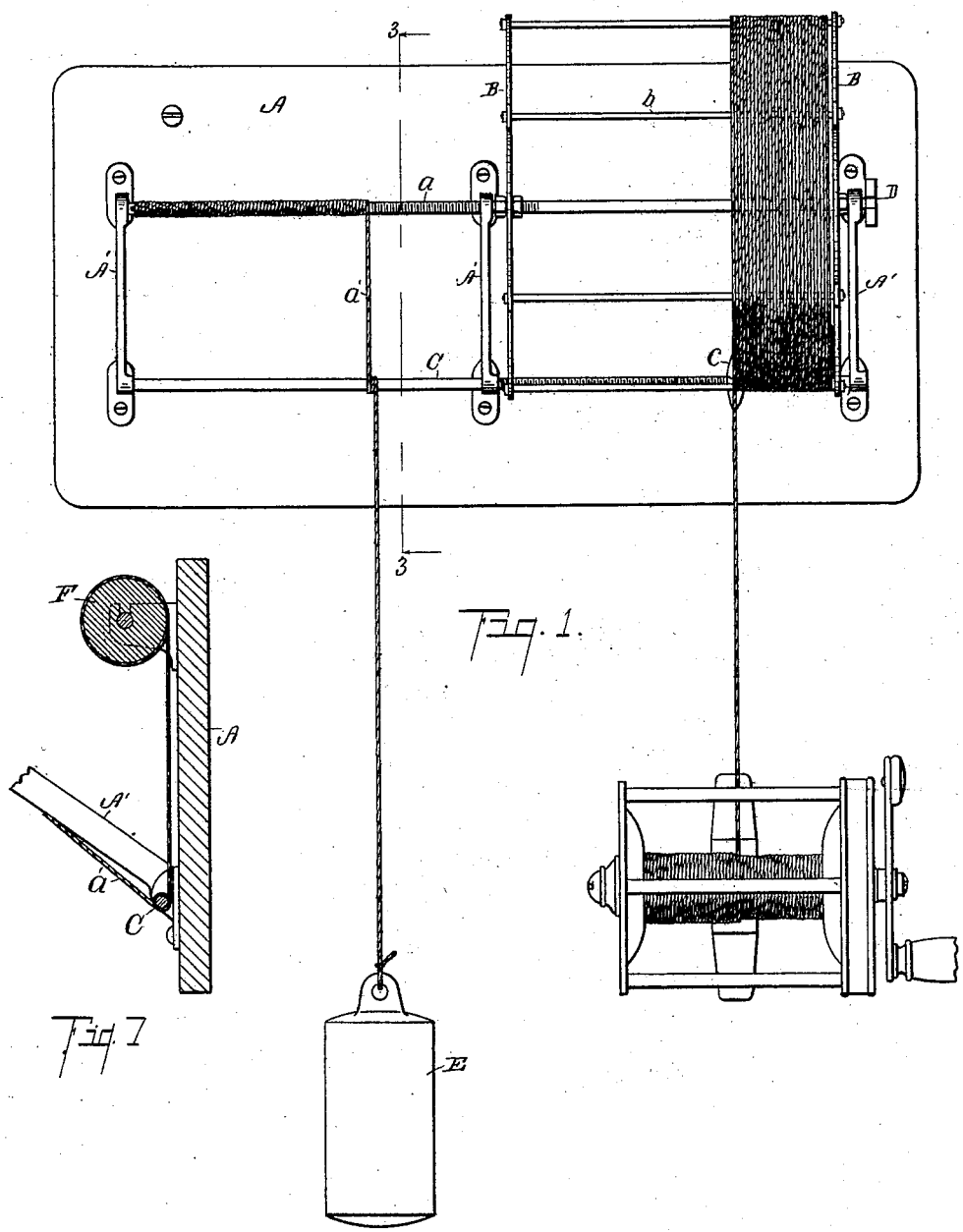

No. 886,690. PATENTED MAY 5, 1908.
C. L. FOWLE.
REEL FOR DRYING FISHING LINES.
APPLICATION FILED MAY 23, 1904.
2 SHEETS—SHEET 2.
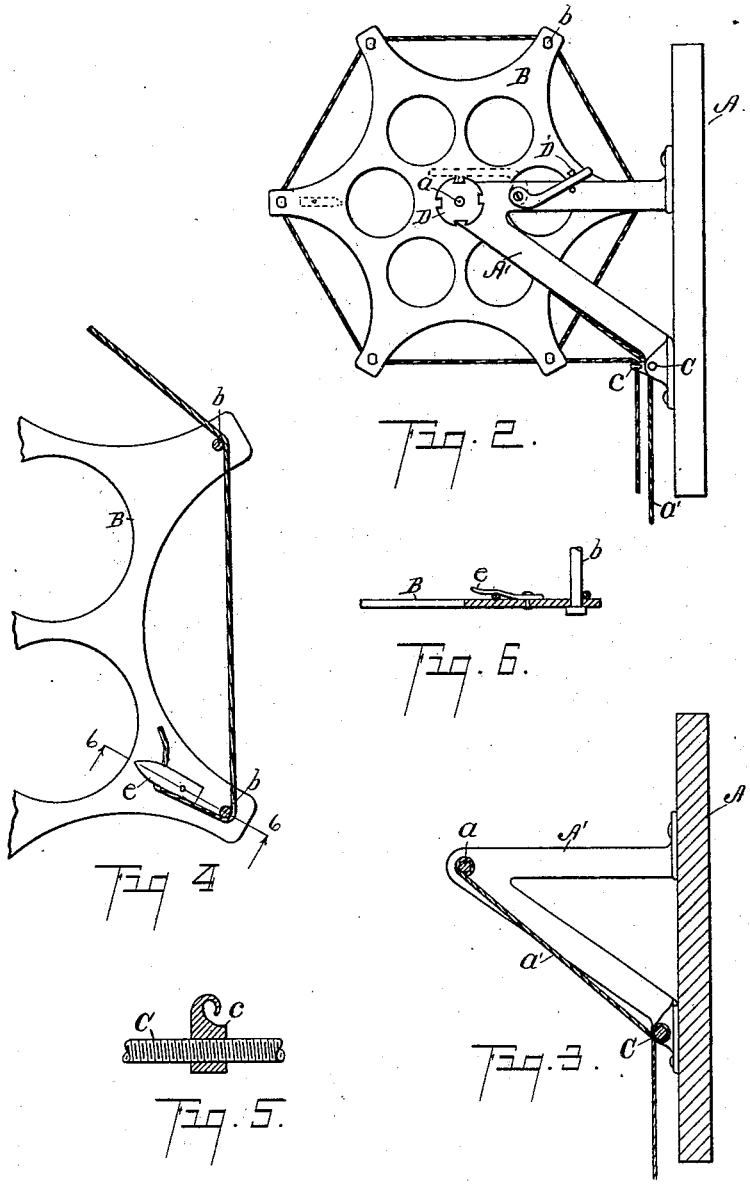
Witnesses:
Otis A. Earl
Ethel A. Seller
Inventor,
Charles L. Fowle
By Fred L. Chappell
Att'y.

UNITED STATES PATENT OFFICE.

CHARLES L. FOWLE, OF DOWAGIAC, MICHIGAN.

REEL FOR DRYING FISHING-LINES.

No. 886,690.      Specification of Letters Patent.      Patented May 5, 1908.

Application filed May 23, 1904. Serial No. 209,287.

*To all whom it may concern:*

Be it known that I, CHARLES L. FOWLE, a citizen of the United States, residing at the city of Dowagiac, in the county of Cass and State of Michigan, have invented certain new and useful Improvements in Reels for Drying Fishing-Lines, of which the following is a specification.

This invention relates to improvements in drying reels for fishing lines and the like. If a fishing line in its wet condition is wound upon a fishing reel and allowed to remain there, it is very likely to be seriously damaged.

The main object of this invention is to provide an improved drying reel for fishing lines which is simple and economical in structure and convenient in use.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings forming a part of this specification, in which—

Figure 1 is a front elevation view of my improved drying reel for fishing lines, the same being illustrated in connection with a fishing reel and line in the process of winding the line upon the drying reel. Fig. 2 is a detail end elevation view, looking from the right of Fig. 1. Fig. 3 is a detail sectional view taken on a line corresponding to line 3 3 of Fig. 1. Fig. 4 is an enlarged detail view showing the manner of securing the end of the fishing line to the drying reel. Fig. 5 is an enlarged longitudinal sectional view through the line guide $c$ and its threaded driving shaft C, the shaft C being shown in full lines. Fig. 6 is a detail sectional view taken on line 6 6 of Fig. 4. Fig. 7 is a detail vertical sectional view corresponding to that shown in Fig. 3, of a modification, a spring driving roller F being substituted for the driving weight E as the driving power.

In the drawings the sectional views are taken looking in the direction of the little arrows at the ends of the section lines, and similar letters of reference refer to similar parts throughout the several views.

Referring to the drawings, a supporting base or frame A is provided. This is preferably a piece of board and is provided with suitable holes so that it may be detachably secured to the side of a wall or other support by screws or the like.

Secured to the supporting base A are brackets A' for the shafts $a$ and C. Mounted upon the shaft $a$ at one end is a reel made up of the disk-like heads B connected together by the rods or pillars $b$. A line guide $c$ is provided. The shaft C is arranged parallel with the shaft $a$ and is threaded at one end to drive the line guide $c$ which is mounted thereon. A notched disk D is secured to one end of the shaft $a$, and a pivoted locking dog D', adapted to engage the disk, is mounted upon one of the brackets A'. When this dog is in engagement with the disk D the reel is locked. A spring $e$ is secured at one end on the inside of one of the heads B, so that the end of the line to be wound upon the reel may be engaged in under the same. (See Figs. 4 and 6.) The reel shaft is driven by the weight E which is suspended upon the driving cord $a'$. The driving cord $a'$ is wound upon the reel shaft $a$ and is also wrapped about the line guide shaft C so that they are both driven by a single weight and at a uniform speed.

In the modified construction shown in Fig. 7, a spring roller F—such as a Hartshorn roller, the structural details of which are not here illustrated—is substituted for the weight E. I, however, prefer the weight as illustrated in Fig. 1, as there is then no variation in the driving power.

In operating my improved line drying reel, the driving cord $a'$ is first wound upon the reel shaft $a$ which carries the guide $c$ to the right hand end of this driving shaft, when arranged as illustrated in the drawings herein. The line to be dried is then secured under the catch $e$ and engaged upon the guide $c$. When the dog D' is released the driving reel begins to revolve. The operator may put any desired tension upon the line that is wound upon the drying reel by holding the fishing reel from which the line is being unwound, or by allowing it to slip through his hand, as desired. The line guide $c$ automatically guides the line upon the reel so that it is wound evenly thereon in a single layer. After the line is dry it is evident that it can be re-wound directly upon the fishing reel, which re-winds the driving cord of the drying reel so that the same is ready for future use without further preparation. The end of the shaft *a* upon which the cord *a'* is wound, is preferably threaded, as this serves to guide the cord thereon in a single layer. When thus wound there are no sudden jerks or slips of the driving cord during the winding operation.

I have illustrated and described my improved line drying reel in detail in the form preferred by me on account of its structural simplicity and economy and convenience in use. I am, however, aware that it is capable of considerable variation in structural details without departing from my invention.

Having thus described my invention, what I claim as new and desire to secure by Letters Patent, is:

1. The combination of a supporting base; shaft supporting brackets mounted thereon; a reel shaft having a screw-threaded portion at one end; a pivoted locking dog for said reel shaft; a reel consisting of disk - like heads and suitable connecting rods or pillars, carried by the said shaft; a line-engaging spring secured at one end on the inside of one of said reel heads; a line guide; a threaded driving shaft therefor, arranged parallel with said reel shaft; a driving cord adapted to be wound upon the threaded portion of said reel shaft, wrapped about said line guide shaft, whereby said shafts are driven; and a suitable weight for said driving cord, for the purpose specified.

2. The combination of a supporting base; shaft supporting brackets mounted thereon; a reel shaft having a screw-threaded portion at one end; a pivoted locking dog for said reel shaft; a reel consisting of disk-like heads and suitable connecting rods or pillars, carried by said shaft; a line guide; a threaded driving shaft therefor, arranged parallel with said reel shaft; a driving cord adapted to be wound upon the threaded portion of said reel shaft, whereby said shafts are driven; and a suitable weight for said driving cord, for the purpose specified.

3. The combination of a supporting base; shaft supporting brackets mounted thereon; a reel shaft having a screw-threaded portion at one end; a reel consisting of disk - like heads and suitable connecting rods or pillars, carried by said shaft; a line-engaging spring secured at one end on the inside of one of said reel heads; a line guide; a threaded driving shaft therefor, arranged parallel with said reel shaft; a driving cord adapted to be wound upon the threaded portion of said reel shaft, whereby said shafts are driven; and a suitable weight for said driving cord, for the purpose specified.

4. The combination of a supporting base; shaft supporting brackets mounted thereon; a reel shaft having a screw-threaded portion at one end; a reel consisting of disk - like heads and suitable connecting rods or pillars, carried by said shaft; a line guide; a threaded driving shaft therefor, arranged parallel with said reel shaft; a driving cord adapted to be wound upon the threaded portion of said reel shaft, whereby said shafts are driven; and a suitable weight for said driving cord, for the purpose specified.

5. The combination of a supporting frame; a reel shaft; a pivoted locking dog for said reel shaft; a reel carried by the said shaft; a line guide; a threaded driving shaft therefor; and a driving cord, adapted to be wound upon said reel shaft, engaging said line guide shaft, whereby said shafts are driven, for the purpose specified.

6. The combination of a supporting frame; a reel shaft; a reel carried by the said shaft; a line guide; a threaded driving shaft therefor; and a driving cord adapted to be wound upon said reel shaft, engaging said line guide shaft, whereby said shafts are driven, for the purpose specified.

In witness whereof I have hereunto set my hand and seal in the presence of two witnesses.

CHARLES L. FOWLE. [L. S.]

Witnesses:
O. SCHMALZRIED,
E. S. McMASTER.